May 29, 1973 G. E. KAYE 3,736,188
BATTERY OF RESERVE CELLS
Filed March 6, 1972
2 Sheets-Sheet 2
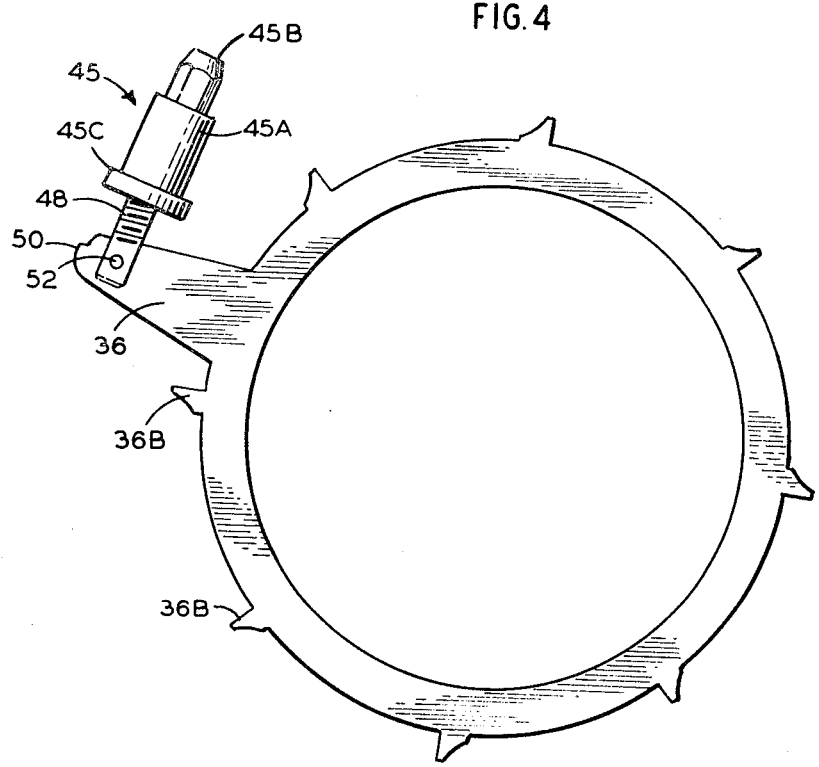
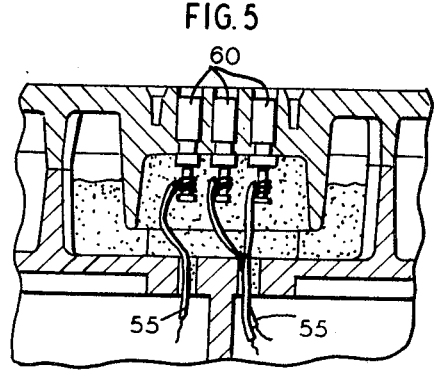
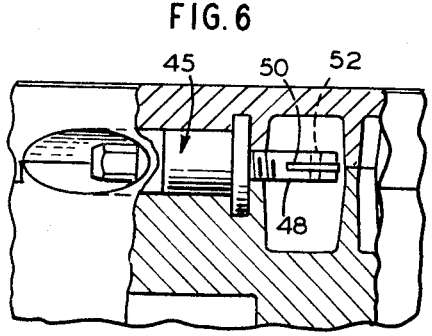
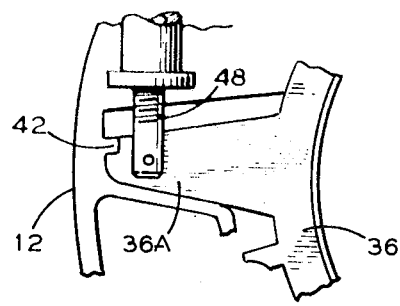

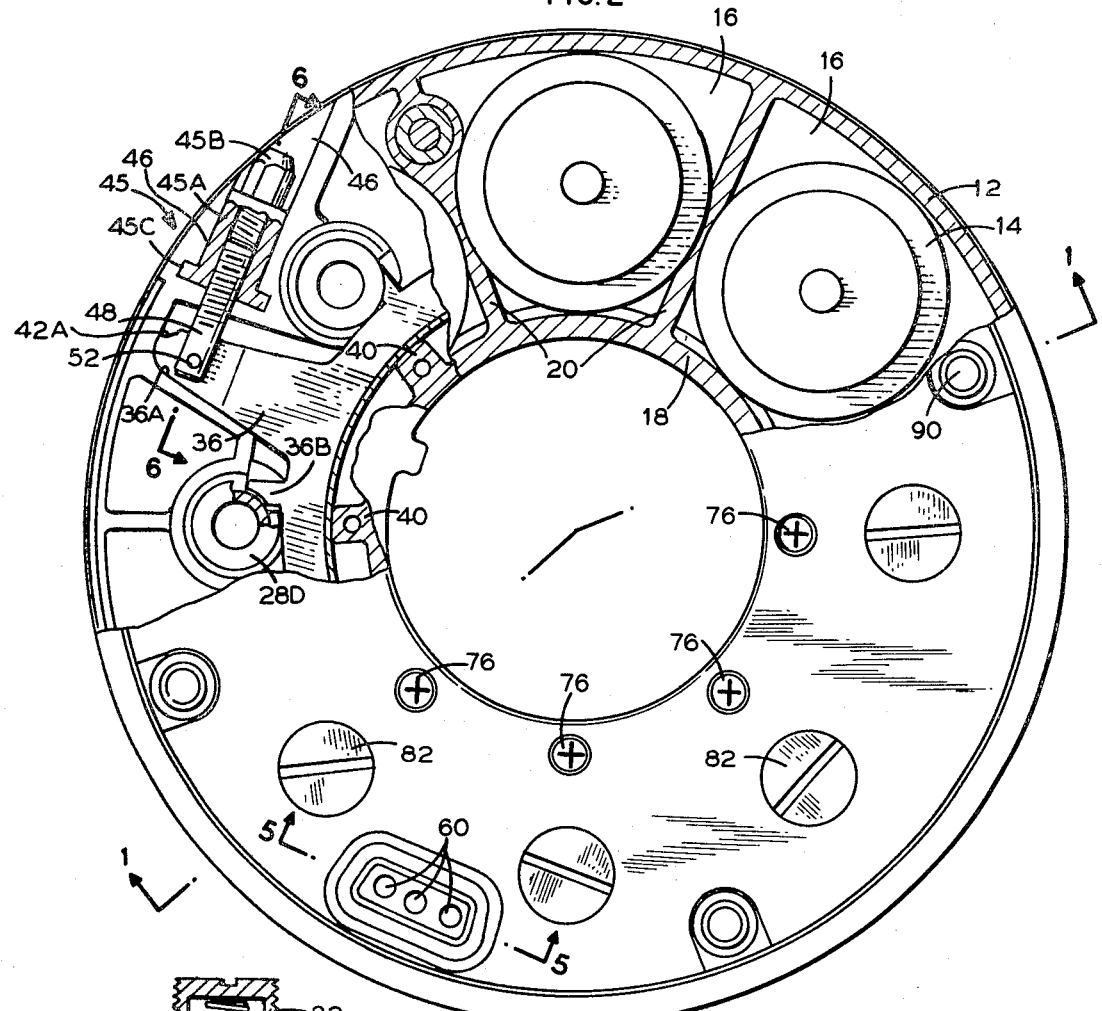
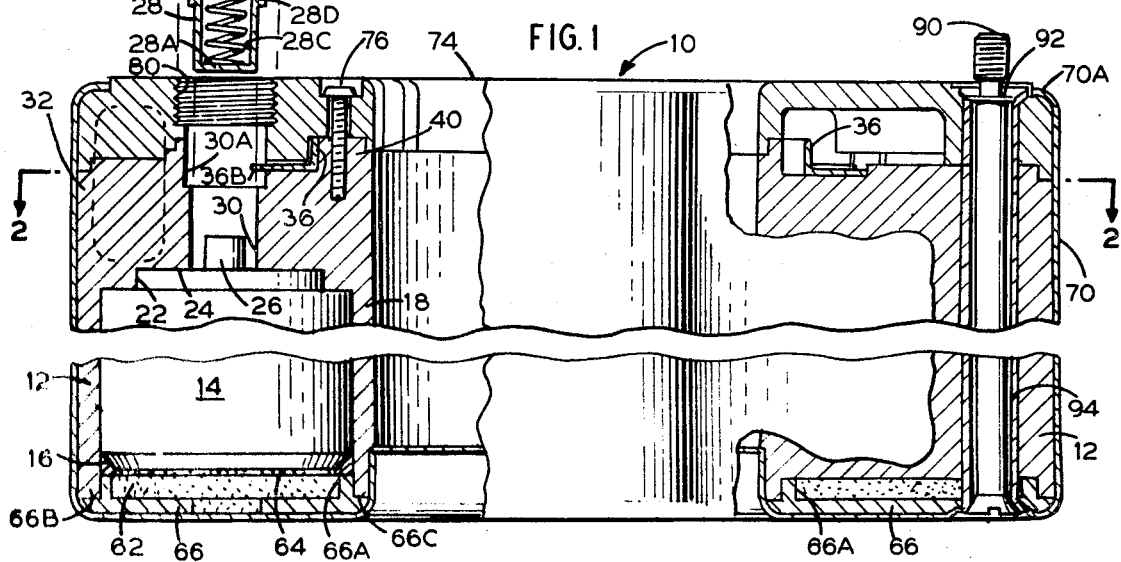

United States Patent Office 3,736,188
Patented May 29, 1973

3,736,188
BATTERY OF RESERVE CELLS
Gordon E. Kaye, Irvington, N.Y., assignor to
P. R. Mallory & Co., Inc., Indianapolis, Ind.
Filed Mar. 6, 1972, Ser. No. 231,819
Int. Cl. H01m 21/10
U.S. Cl. 136—90    11 Claims

ABSTRACT OF THE DISCLOSURE

A battery of reserve cells, each containing a hermetically sealed vial of fluid electrolyte with normally restrained stored-energy impact device to fracture said vial to release said electrolyte to operative activating position in each cell; and unitary means, for normally restraining all said impact devices, and at will, to render all the reserve cells immediately active.

---

This invention relates to a battery of reserve cells which is normally kept in the inactive state while it is being stored and awaiting use, and is constructed to permit immediate activation to be available for immediate use, when such use is desired. There are many cases where a battery is stored to be available for subsequent use when called upon. In many of these cases, the batteries are required and intended for emergency use upon the random occurrence of faulty or dangerous conditions. Until such conditions occur, the battery is not needed, and it has been found undesirable for a battery to be standing idle in full activated condition, since internal chemical reactions could and might take place while the battery is standing idle and doing no effective work.

In order to prolong the effective life of the battery, the one or more cells which make up the battery have been constructed to normally be in unactivated condition while standing idle and waiting to be called on for duty service. When the batteries are called on for service, the construction of the battery has been made such as to enable it to be immediately activated and available for service. A cell of such reserve type which is normally unactivated and which is activated when the service of the cell is desired, is disclosed in U.S. Pat. No. 3,484,297 of J. F. Zaleski, issued Dec. 16, 1969, and assigned to the common assignee of this patent application.

In the present invention, a plurality of such reserve cells are disposed and stored in a common shell or housing in normally unactivated condition, so the cells may be idle without loss of internal energy that would result from natural chemical action while the cells are standing idle and waiting to be called on for service if they were activated. The construction of the battery assembly is made such as to enable the reserve cells to be all rendered active when the battery is to be called on for service.

The reserve cell, as disclosed in the Zaleski patent referred to above and as utilized in the present invention consists of a closed container with the usual cell polar elements of anode and cathode appropriately disposed and separated from each other, and including a frangible hermetically sealed vial containing the electrolyte for the cell, with provision of a suitable element for fracturing the vial to release the electrolyte, which is in a fluid state, whereupon the released electrolyte will move into the appropriately designed space between the anode and the cathode to establish an activated cell assembly which is then immediately available to provide electrical energy to an external circuit, when so called upon.

In this invention, electric cells that are used are the same size and shape for easy assembly in a unitary shell for the several cells as a battery. Each reserve cell is provided with a flexible diaphragm at its upper end that has a limited degree of freedom of movement, which is sufficient, when actuated by an external force, to engage and fracture the frangible vial that contains the liquid electrolyte within the cell. In this invention each reserve cell is provided with a spring-actuable impact element held in restraining position a short distance above the diaphragn in the assembly of the battery structure. A unitary restraining element is provided with several spaced separate restraining fingers, one disposed adjacent each cell to be effective to restrain the impact element of each of the cells against the energy of the associated compressed spring. Those fingers serve to restrain the impact element during normal standby condition, while the battery is not being called on for service. When the battery is to be placed in service to provide energy to an external circuit, the restraining member is actuated, so its several restraining fingers are moved from their restraining positions and serve to release the impact elements of the several cells. The respective associated springs that have been held in compressed condition, are immediately released to impart their stored energy to the impact elements against the diaphragm of the cell, to cause the fracture of the vial within the cell and to thereby release the electrolyte to activate the cell.

The construction of the battery structure and the arrangement of the cells with the restraining element and the manner in which the restraining element is disposed initially to restrain the impact elements for each cell, and subsequently to release those impact elements, are described in the following specification in connection with the accompanying drawings, in which:

FIG. 1 is a front elevational view, partially in section, of the assembled battery of this invention;

FIG. 2 is a plan view in section, partly taken along the plane indicated by the 2—2 line in FIG. 1, and also shows the plan in section partly at a plane taken through the 2A—2A line through the battery as shown in FIG. 1;

FIG. 3 is a schematic plan view showing how the initial position of the detent ring is determined by engagement with a small frangible rib to be broken away when the detent ring is to be turned to release position;

FIG. 4 is a schematic plan view of the detent ring and its crank arm to which the actuator is attached;

FIG. 5 is a vertical sectional view taken in the vertical plane along line 5—5 of FIG. 2; and FIG. 6 is a vertical sectional view taken in the vertical plane along line 6—6 of FIG. 2.

Thus, a primary object of this invention is to provide a reserve cell holder that may be easily and economically assembled, to hold the cells de-activated; and that will be easy to operate to operating position to activate the cells for immediate service.

As shown in the drawings, the invention generally comprises a battery assembly, with a housing for a plurality of electric cells, here shown, for example, as eight in number, with the housing arranged as a substantially cylindrical shell, with individual compartments parallel to the shell axis and with the compartments open at their bottom ends to permit insertion of the respective cells, after which a bottom cover may be applied to hold the shells in place; and with appropriate mechanism adjacent the upper ends of the cells to serve as fracturing elements, normally restrained while the battery is standing idle waiting to be called on for service, with a simple arrangement for releasing the fracturing elements to activate the cells when the battery is to be placed in service.

As shown in FIG. 1, a battery housing 10 comprises a substantially cylindrical shell 12, which serves as a cell holder for a plurality of cells 14, and in which a separate compartment 16 is provided for each cell, defined as shown in FIG. 2, as part of the annular space between the outer cylindrical shell 12 and a co-axial concentric inner shell 18, with radial separating ribs 20 as walls separating the several compartments and providing a relatively snug fit for the cells 14 when they are inserted in their compartments 16, to thereby prevent jiggling of the cells in their cell holder 12 in response to any external forces or vibration.

As shown in FIG. 1, the cell holder 12 is open both at the top and at the bottom. The individual cells 14 are insertable into the respective compartments 16 from the bottom of the cell holder 12, and the space in each compartment 16 is appropriately defined by the structure of the wall of the plastic cell holder 12 to enable the cell 14 to seat snugly both between the walls 20, as seen in FIG. 2, and between the outer wall 12 of the cell holder and the inner wall 18. The top of the cell 14 fits snugly into a circular recess 22 against an annular sealing surface 24, in order to place the diphragm of the cell 14 in appropriate position to be engaged by a fracturing element 26, shown as a plunger rod connected to a plunger 28 disposed co-axially in an opening 30 in the upper support wall 32, which serves as an annular ceiling structure above the several compartments 16 for the respective electric cells 14. The plunger 28 is shown as a thimble-shaped cylinder, with a closure 28A at its bottom end, and having an internal co-axial cavity 28C to accommodate a helical compression spring 34, which is to be compressed during assembly and is to remain compressed so long as the battery is standing idle and not needed, and left in unactivated condition.

In order to hold each thimble-shaped plunger 28 in restrained condition and position, against the force of the spring 34 when compressed, the thimble-shaped plunger 28 is provided with an outwardly extending top rim flange 28D, which is held in elevated restrained condition by a detent ring 36, so long as the battery is to remain unactivated.

The detent ring is shown in FIGS. 1 and 2 as being an annular ring, provided with a lever arm crank 36A, by means of which the ring may be angularly turned through a small angle of a few degrees, to shift integral fingers 36B on the ring 36 away from normal restraining position, under the rim 28D, of the associated thimble-shaped plunger 28. The angular movement of the detent ring 36 removes the fingers 36B, from underneath those rims 28D, to a position beyond and outside the peripheral contour line of the rim 28D, whereupon the thimble-shaped plunger 28 may be actuated and propelled by the spring 34, which will have been maintained in compressed condition until such release by the detent ring 36.

The transverse support wall of the plastic shell 12 which serves as the cell holder, is shown in FIG. 1 as provided with several circularly disposed bosses 40 which serve a double purpose. For the present purpose, the bosses 40, located as shown in more detail in FIG. 2, serve as pilot or guide elements for properly locating the detent ring 36, when the ring is positioned on the cell holder shell during assembly.

Further, in order that the detent ring may also be properly positioned in its angular position, to serve initially as a detent for all the thimble-shaped plungers 28, the plastic cell holder structure 12 is initially provided with a vertical upper rib 42, as seen in FIG. 2, whose lower surface edge 42A defines the original limiting position for the crank arm 36A of the detent ring. When the detent ring is subsequently to be angularly turned through a small angle of a few full degrees, to withdraw the detent fingers 36B from under the rims 28D of the thimble-shaped plungers 28, an activating assembly 45 is provided for that purpose.

The activating assembly 45 includes an internally threaded activating nut 45A, having a hexagonally shaped head 45B and a bottom circular flange 45C to hold the activating nut 45 in its positioning groove 46, while permitting rotation of the nut 45 but preventing any axial movement of the nut during such rotation. Rotation of the nut then serves to pull upward and inward into the nut, a clevis screw pin 48 whose lower end is provided with a central axial slot 50, which, in assembly, straddles the end of the crank 36A of the detent ring 36. The clevis screw pin 48 is secured to the crank 36A by a roll pin 52.

In the assembling of the cells 14 within the cell holder 12, the cells are appropriately connected for series or parallel connections according to the desired voltage and capacity desired of the cells, and the end and mid terminal wiring 55 is brought out to a set of terminals 60, for receiving a suitable terminal connector for connection to an external circuit.

When the electrical connections between the cells are completed, the bottom of the cell holder 12 is arranged to be closed. For that purpose an insulating seating disc 62 is provided at the bottom of each cell 14 which serves also as a pressure disc against a conducting metallic strip 64 which is suitably spot welded or soldered to the bottom of the metallic container of the cell 14. A bottom cover 66 is then applied to the bottom of the cell holder 12. The bottom cover 66 is an annular ring with arcuate vertical flanges 66A of appropriate dimension to press-fit and snap-fit into the lower open ends of the cell cavities 16, between the outer shell wall 12 and the inner shell wall 18.

The lower cover 66 also embodies a circular outer peripheral rim 66B to fit snugly into the outer shell wall, and embodies inner arcuate sections 66C to fit against the inner wall 18.

When the bottom cover 66 is pressed into place, under the cells, the cell holder and the assembled cells are disposed in an outer metal case 70, to provide a tight fitting outer closure, which will be completely closed by peening over onto the cell holder after the top cover is assembled in place and suitably connected to the cell holder structure.

In the assembling operation, the detent ring is positioned, as previously explained, to fit around the bosses 40 and to engage the lower edge of the guide rib 42. A top cover 74 is then placed in position and secured to the shell holder structure by several self-tapping screws 76, as shown in FIGS. 1 and 2. The top rim edge of the metal outer case 70 is then peened over at 70A to further enclose the cell holder structure.

The spring assemblies for activating the respective cells are then assembled. The cover 74, as formed, is provided with a threaded opening 80 co-axially above each of the respective cells 14. That opening 80 is co-axially disposed above the opening 30 in the upper wall structure 32 of the cell holder, which permits the introduction of a plunger rod 26 into the opening 30 with the rod arranged to be held in co-axial alignment in the opening 30 and co-axially above the related cell. The thimble-shaped plunger 28 is then inserted through the opening 80 to seat loosely in the hold 30, and the restraining rim 28D of plunger 28 will seat on the finger 36B of the detent ring 36. The hole 30 is diametrically enlarged at the region 30A to be slightly larger than the diameter of the rim 28D, to permit free movement of the plunger 28 when the plunger is later released by the detent ring 36. The helical spring 34 is then inserted, uncompressed, through the opening 80 into the internal cavity 28C of the plungers 28. The spring is then compressed in the restrained and detented plunger 28 by an externally threaded cap screw 82, which threads down into the threaded hole 80 to the desired distance to compress the spring 34.

In order to provide for mounting the battery assembly, the structure may be provided with a plurality of mounting bolts 90, for which suitable holes 92 are originally formed in the plastic cell holder 12 to accommodate several long cylindrical metal eyelets 94, to take the stress of the mounting bolt when it is threaded into a suitable mounting structure to support the battery. The head of the bolt at one end of eyelet, and a single disc at the other end of the bolt, serve to hold the bolt against casual fall-out from the eyelet.

By means of the assembly disclosed herein, a group of reserve cells can be assembled as a battery, which can be stored and suitably mounted near the place where they are to be used, with the reserve cells kept in non-active condition and therefore able to sustain a long storage life during their inactive period and until their use is desired. At that time, the cells can be rendered active by the operation of rotating the activating nut 45 to move the detent ring through the small angle that is sufficient to move the detent fingers 36B from beneath the related rims 28D of the several plungers 28. Thereupon, the compressed springs 34 propel the associated plungers 28 downward to strike the bottom surfaces of the plungers 28A against the plunger rods 26 to impress a high impact force on the diaphragm of the associated reserve cell, sufficient to fracture the frangible vial within that sell, to cause release of the electrolyte from the vial into the operating space of the cell.

As shown in FIG. 2, and more clearly in FIG. 3, the original positioning of the detent ring 36 is determined by the small rib 42, that is easily broken away to permit free turning of the detent ring to move the detent fingers 36B, of FIG. 4, from under the restraining rim 28D of plungers 28 of the respective cells. The operation of the actuating device, as just described, then activates the several cells to ready the battery for service.

While the invention as described illustrates a preferred construction of the battery, the construction is not limited to the details that are illustrated, since they may be variously modified without departing from the spirit and scope of the invention, as set forth and described in the claims.

What is claimed is:

1. A multi-cell battery of reserve cells comprising:
   a container formed of inner and outer shells of insulating material, to serve as a cell holder, said container having an internal annular chamber generally arranged to accommodate a plurality of reserve cells that are to remain inactive electrically and electrochemically until activated, and said shell further embodying means for defining the contour locus for a co-axial ring;
   a plurality of reserve cells disposed in said chamber, each reserve cell including a container hermetically sealed and containing polar elements, and a closed frangible vessel having a liquid electrolyte therein, and a sealing closure diaphragm for said container, said diaphragm being movable through a limited distance in response to an externally applied force to fracture said frangible vessel and to release the electrolyte to a working position between the polar elements to render the cell active;
   a top plate within said annular chamber to define a top limit position for each cell upon insertion, said top plate having an opening at and co-axial with each cell space, with each such opening serving to accommodate energy-storage means;
   separate and independent energy storage means at each cell for actuating said related diaphragm to fracture said related frangible vessel;
   common means for restraining said energy-storage means of all said reserve cells comprising an annular ring to slip-fit on said means which defines the contour locus for said annular ring, said annular ring further embodying radial finger elements extending outwardly from said ring; said finger elements being equivalent in number to the number of reserve cells, each finger element being positioned to restrain a corresponding energy storage means;
   and means for controlling said restraining means to render said restraining means effective, or to release said energy storage means.

2. A multi-cell battery, as in claim 1, in which said energy-storage means at each cell includes:
   a spring actuable plunger;
   a spring in compressed energy-storage condition to actuate said plunger;
   and said finger element acting as a detent to restrain said plunger so long as said cell is to be maintained inactive;
   and said common restraining means for restraining said energy-storage means includes means for controlling the detention and the release of each plunger.

3. A multi-cell battery of reserve cells comprising:
   a container formed of inner and outer cylindrical shells of insulating material to serve as an annular cell holder, said cell holder initially formed to be open at the top and bottom axially, and having compartmented spaces formed therein for receiving individual cells, and said cell holder further embodying means for defining the contour locus for a co-axial annual ring;
   a plurality of reserve cells disposed in said compartmented spaces, each reserve cell including a container hermetically sealed and containing polar elements, and a closed frangible vessel having a liquid electrolyte therein, and a sealing closure diaphragm for said container, said diaphragm being movable through limited distance in response to an externally applied force to fracture said frangible vessel and to release the electrolyte to a working position between the polar elements to render the cell active;
   separate and independent energy storage means at each cell for actuating said related diaphragm to fracture said related frangible vessel;
   common means for restraining said energy-storage means of all said reserve cells comprising an annular ring to slip-fit on said means which defines the contour locus for said annular ring, said annular ring further embodying radial finger elements extending outwardly from said ring; said finger elements being equivalent in number to the number of reserve cells, each finger element being positioned to restrain a corresponding energy storage means;
   means for controlling said restraining means to render said restraining means effective, or to release said energy-storage means;
   means supported on said cylindrical shell to serve as a top plate to define a top limit position for each cell upon insertion, said top plate having an opening at and co-axial with each cell space, with each such opening serving to accommodate said energy-storage means for actuating said diaphragm;
   a bottom cover disposed on the shell to hold the cells in place against axial displacement, after assembly;
   a top cover for said shell, to hold said energy-storage means fixed in place at their upper ends;
   and means for holding the top cover and the bottom cover fixed to said shell.

4. A multi-cell battery, as in claim 3, in which
   said energy-storage means at each cell consists of a helical spring, with means for compressing said spring including a movable element at the front end of said spring and an adjustable anchoring element at the back end of said spring;
   said restraining means is positioned to be effective to hold said movable element at said front end of said spring from movement while said cell is to be maintained inactive;
   and said controlling means for releasing said restraining means functions to shift said restraining means to non-restraining position, to release the pressure on said spring and to permit the spring with its stored energy to actuate said movable element at its front end to impact said diaphragm and to fracture the frangible container of the electrolyte to release said electrolyte and to active the cell.

5. A multi-cell battery, as in claim 3, in which
   said energy-storage means for each cell includes:
   a plunger disposed in and co-axially movable in said opening, said plunger being essentially a hollow cylinder closed at its bottom end and having an outwardly flared rim at its top end,
a helical spring fitting freely into said hollow cylinder, and a cap for compressing said spring into said cylinder to store energy in said spring;
each of said finger elements of said common restraining means extends under said outwardly flared rim of said plunger for each cell for restraining said plunger against movement by said spring until said common restraining means is actuated to remove said finger element from said flared rim, to thereby permit said spring to then actuate said plunger against its associated diaphragm to fracture the vessel of electrolyte and to release the electrolyte to activate the cell;
and means for initially locating the positioning of said restraining means on said shell prior to applying the top cover, so said finger elements of said ring will be positioned tangentially to said plunger-receiving openings so said finger elements will be under the plunger rims when the plungers are inserted into their respective associated holes.

6. A multi-cell battery, as in claim 5, including additionally,
means for angularly shifting said annular ring to slip the several restraining fingers from under the plunger rims to release said rims and to permit the associated compressed springs to drive the plungers forward against the associated diaphragms to fracture the frangible vessels and to release the electrolytes to activate the several cells.

7. A multi-cell battery, as in claim 5, in which
said restraining means further includes a crank-arm on said annular ring for turning said annular ring through a predetermined small angle.

8. A multi-cell battery, as in claim 7, in which
said means for controlling said restraining means includes a threaded screw element to serve as an actuating means for impressing a turning force on said crank-arm.

9. A multi-cell battery, as in claim 7, in which
said top cover is disposed to seat on said shell to cover and hold said annular ring in place against axial displacement, said top cover having a concave groove in its bottom surface to mate with a concave groove in said top plate, and to define an axis;
a threaded nut is disposed co-axially in said mating grooves and is held against axial translation during permitted angular rotation of said nut;
and a threaded bolt is pinned at one end to said crank-arm of said annular ring, and is axially movable by rotation of said threaded nut to angularly move said annular ring to release position to release the energy-storage means to activate the reserve cells.

10. A multi-cell battery, as in claim 7, in which
a positioning rib is disposed on said top plate to locate an original positioning limit for said crank-arm of said annular ring, to assure proper initial restraining positioning of said restraining radial finger elements of said annular ring.

11. A multi-cell battery, as in claim 10, in which
said positioning rib is frangible and constructed and disposed to be broken off by angular movement of said crank-arm, to permit continuing movement of said crank-arm to turn the annular ring through a small angle to release position to release the energy-storage means to activate the cells.

References Cited

UNITED STATES PATENTS

| | | | |
|---|---|---|---|
| 2,502,723 | 4/1950 | Harriss | 136—113 |
| 3,484,297 | 12/1969 | Zaleski | 136—114 |
| 3,470,029 | 9/1969 | Meyers et al. | 136—90 |
| 2,763,706 | 9/1956 | Barrett | 136—90 |
| 3,053,928 | 9/1962 | Hopkins | 136—90 |
| 1,218,847 | 3/1917 | Firey | 136—90 |
| 3,669,753 | 6/1972 | Kaye | 136—90 |
| 3,177,098 | 4/1965 | Amiet et al. | 136—90 |

FOREIGN PATENTS

| | | | |
|---|---|---|---|
| 768,188 | 2/1957 | Great Britain | 136—90 |

HARVEY E. BEHREND, Primary Examiner

U.S. Cl. X.R.

136—113

UNITED STATES PATENT OFFICE
CERTIFICATE OF CORRECTION

PATENT NO. : 3,736,188
DATED : May 29, 1973
INVENTOR(S) : Gordon E. Kaye

It is certified that error appears in the above-identified patent and that said Letters Patent are hereby corrected as shown below:

Column 1, line 18, insert as a new first paragraph of the patent:
--The invention herein described was made in the course of or under a contract with the Department of the Navy.--

Signed and Sealed this sixteenth Day of March 1976

[SEAL]

Attest:

RUTH C. MASON
Attesting Officer

C. MARSHALL DANN
Commissioner of Patents and Trademarks